Figure 1:
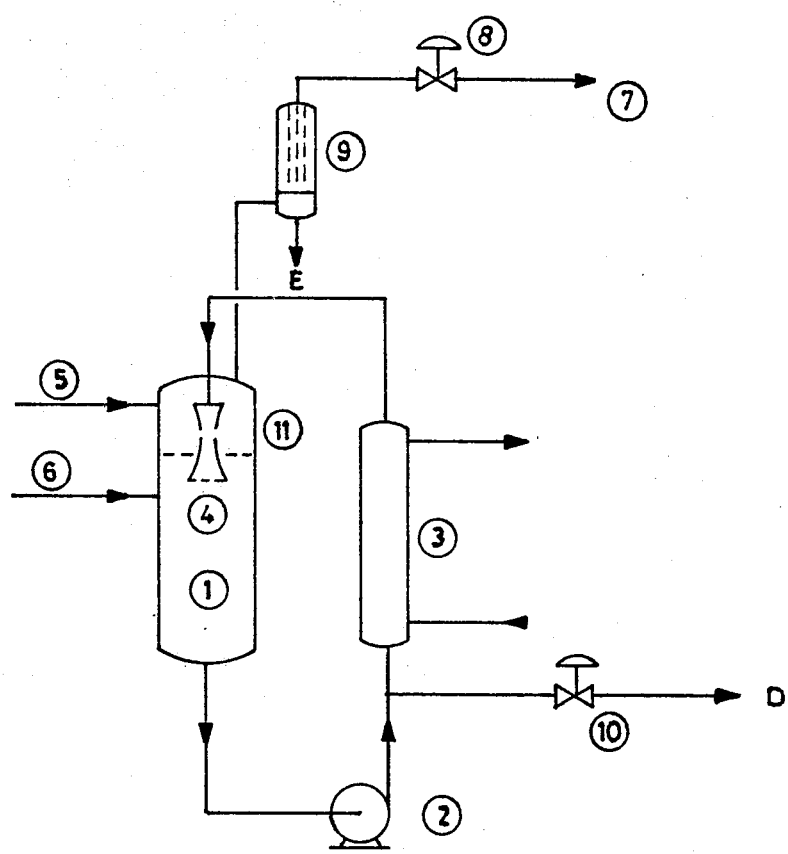

United States Patent [19]

Couteau et al.

[11] 4,216,339

[45] Aug. 5, 1980

[54] PROCESS FOR THE PRODUCTION OF METHYL FORMATE

[75] Inventors: Willy Couteau, Brussels; Jean Ramioulle, Bierghes, both of Belgium

[73] Assignee: U C B, Societe Anonyme, Brussels, Belgium

[21] Appl. No.: 776,369

[22] Filed: Mar. 10, 1977

[30] Foreign Application Priority Data

Mar. 12, 1976 [GB] United Kingdom ............... 10026/76

[51] Int. Cl.² .............................................. C07C 67/36
[52] U.S. Cl. .................................... 560/232; 562/519
[58] Field of Search ......................... 560/232; 562/519

[56] References Cited

U.S. PATENT DOCUMENTS 3,816,513   6/1974   Wakamatsu et al. ................ 560/232

Primary Examiner—Vivian Garner
Attorney, Agent, or Firm—Wenderoth, Lind & Ponack

[57] ABSTRACT

The invention relates to an improved process for the production of methyl formate, wherein a current of a gas containing carbon monoxide is reacted at elevated temperature (70°–110° C.) and pressure (20–110 bars) in a reaction zone with a recycled current of liquid reaction mixture containing (a) methanol
(b) an alkali metal or alkaline earth metal methoxide as catalyst, and
(c) methyl formate produced as reaction product, part of the current of liquid reaction mixture being withdrawn in order to recover methyl formate therefrom.

The characteristic feature of the invention consists in that the recycled liquid reaction mixture is used for sucking and dispersing the current of gas in the reaction mixture. Advantages of the process are: excellent heat exchange, high productivity, absence of solid deposits on the internal surfaces of the apparatus, lower operating pressures and temperatures, use of apparatus of smaller dimensions, suppression of recycling of carbon monoxide, etc.

11 Claims, 1 Drawing Figure

PROCESS FOR THE PRODUCTION OF METHYL FORMATE

The present invention relates to a process for the production of methyl formate from carbon monoxide and methanol in the presence of an alkali metal or alkaline earth metal methoxide at elevated pressure and temperature.

The industrial production of methyl formate by this process encounters a number of technical difficulties which it has not yet been possible to overcome completely. First, this reaction is very exothermic (about 8 kcal per mole of methyl formate formed are generated) so that very efficient heat exchange means are required in order to dissipate the heat of reaction. Furthermore, the alkali metal or alkaline earth metal methoxide used as catalyst, which has a good solubility in the methanol used as starting material, has, on the other hand, only a very low solubility in the methyl formate formed in the reaction; the result of this is that, if the methanol is converted beyond a certain limit, a solid precipitate of catalyst is formed, which clogs the pipes and valves of the installation and also produces solid incrustations on the heat exchanger surfaces, with the result that the dissipation of heat becomes increasingly poor in the course of time. Furthermore, when humidity is present, the alkali metal or alkaline earth metal methoxide reacts with carbon monoxide to form the corresponding alkali metal or alkaline earth metal formate, which is also very sparingly soluble in methyl formate and, consequently, also gives rise to the same operational disturbances as mentioned above in connection with the alkali metal or alkaline earth metal methoxide; in addition, there is a progressive reduction of the activity of the catalyst because of its conversion into alkali metal or alkaline earth metal formate, which does not catalyse the conversion of methanol and carbon monoxide into methyl formate. Finally, at the present time, this synthesis requires high operating pressures, which may be as high as 300 bars or more, so that there is considerable expense for the construction of apparatus able to withstand these high pressures.

Various proposals have already been made for overcoming these difficulties. Thus, according to German Patent Specification No. 926,785, a much smaller amount of catalyst is used in order to prevent precipitation thereof but, as a result, the yield per unit of volume of reaction zone and per unit of time are no longer economically satisfactory; this step does not, in course of time prevent anyhow the same operating difficulties from occurring because of the formation of solid deposits. It is also necessary for the reaction mixture to be mechanically stirred, which causes almost insuperable problems at the high pressures employed.

According to German Patent Specification No. 1,046,602, the process is carried out in two stages: in the first stage, the amount of carbon monoxide necessary for converting about 70 to 75% of the methanol into methyl formate under turbulent conditions is added, the heat of reaction being dissipated on cooling surfaces, while, in the second stage, the conversion is completed by the further addition of carbon monoxide, with the absorption of the heat of reaction with the aid of the liquid or gaseous starting materials introduced into the installation. Nevertheless, according to statements made by the patentee in subsequent German Patent Specification No. 1,147,214, which will be referred to hereinafter, this process is satisfactory only provided that the following factors are kept strictly constant: the pressure of the carbon monoxide, the temperature of the cooling water and the purity of the reactants, failing which the precipitation phenomena recur.

According to the above-mentioned German Patent Specification No. 1,147,214, it is proposed to feed the carbon monoxide at two different points and in different proportions, while periodically varying the proportions of these partial currents of carbon monoxide and from time to time increasing the amount of reaction mixture which is continuously withdrawn from the reaction vessel. It seems clear that this method of operation requires close supervision in order to select the moment when these variations of operation of the apparatus must be carried out.

According to Belgian Patent Specification No. 804,581, the synthesis of methyl formate is effected with the aid of a gaseous mixture containing carbon monoxide and of methanol in the presence of an alkali metal methoxide in a so-called "submerged plates" column, each of these plates being provided with a self-contained cooler, the gaseous mixture being introduced only in the bottom part of the column. The liquid reaction product withdrawn at the bottom of the column contains from 20 to 70% by weight, especially from 30 to 60% by weight, of methyl formate. It will be understood that the construction of a column of this kind, in which each plate has its own cooling system, is necessarily complicated and expensive and that it requires particular care having regard to the high pressures (about 300 bars) which have to prevail in it. In order to retain control of the exothermic reaction, it is essential that the temperature of the reaction mixture should be monitored at each plate and it is also necessary for the temperature and the flow rate of the temperature-controlling agent to be known at every moment. The volume of liquid reaction mixture treated represents only from about 10 to 20% of the volume of the column. If there is humidity in the reactants (i.e. the formation of solid alkali metal formate at the expense of alkali metal methoxide) or in the event of a high degree of conversion (precipitation of alkali metal methoxide), the problems of clogging on the plates arise to a marked extent. Moreover, the carbon monoxide of the gaseous mixture used as source of carbon monoxide is not entirely converted into methyl formate so that it has to be recycled to the reaction, with accompanying considerable expense for recompression and cooling, or else it must be used in another synthesis, for example the synthesis of methanol as proposed in this Belgian Patent Specification. This last possibility can be considered only if, in addition to the methyl formate synthesis, a methanol synthesis installation is also available, which is not always the case. Finally, this process might have appeared interesting when the cost of pure carbon monoxide was considerably higher than that of a gaseous mixture containing it; at the present time, however, the situation has changed considerably since the appearance of new techniques for the purification of carbon monoxide, such as for example the Cosorb process of the firm Tenneco Chemicals (see Chem.Engineering, 4th August, 1975, p. 52), which provide carbon monoxide of sufficient purity for the production of methyl formate at an acceptable price.

Thus, it can be seen that, except when the residual gaseous mixture of the synthesis of methyl formate is used for another synthesis, for example that of methanol, it is necessary to recycle the carbon monoxide in order to avoid the loss of a considerable quantity thereof, this being due to the short contact time between the gaseous mixture and the liquid, so that there is a low conversion of carbon monoxide per pass. Recycling means that the residual gases must be cooled, this being also necessary in order to recover the entrained methyl formate, whereupon they must be recompressed before being reintroduced into the system. Investments for condensers and compressors for recycling represent from about 100 to 150% of the investment involved by the apparatus for the actual synthesis, without taking into account the fact that recycling entails considerable expense in respect of energy used for its performance.

In conclusion, considerable progress would be made if the production of methyl formate could be effected:

(a) under more moderate conditions of operation, particularly at lower pressures, making it possible to use carbon monoxide either in the pure state or diluted with inert gases;

(b) in a production apparatus which is less expensive (particularly because of the lower pressures used) and of smaller dimensions (because, for the same methyl formate production capacity, the volume occupied by the liquid reaction mixture would be considerably increased in relation to the useful volume of the apparatus);

(c) with excellent conversion of carbon monoxide and methanol into methyl formate, which particularly eliminates the need for recycling the gaseous mixture and consequently the investments and energy expenses connected with this recycling;

(d) with simpler and more reliable control of the reaction temperature in different parts of the apparatus;

(e) with complete elimination of the danger of the clogging of the apparatus by solid deposits; and (f) with a more advantageous productivity of methyl formate than at the present time, productivity being understood to mean the number of kilograms of methyl formate produced per hour per liter of capacity of the apparatus.

These various objects are achieved by the process according to the present invention.

Consequently, the present invention provides an improved process for the production of methyl formate, wherein a current of a gas containing carbon monoxide is reacted at elevated temperature and pressure in a reaction zone with a recycled current of liquid reaction mixture containing:

(a) methanol (b) an alkali metal or alkaline earth metal methoxide as catalyst, and (c) methyl formate produced as reaction product, part of the current of liquid reaction mixture being withdrawn in order to recover methyl formate therefrom and wherein the recycled liquid reaction mixture is used for sucking and dispersing the current of gas in the reaction zone.

The process of the present invention can be carried out in any apparatus, provided that the recycled current of liquid reaction mixture is used for sucking and dispersing the current of gas in the reaction zone. However, it is preferable to use an apparatus comprising a reaction vessel, a pump for recycling the current of liquid reaction mixture, a heat exchanger and a means for sucking and dispersing a current of gas in the current of liquid reaction mixture, such as described hereinafter.

We have, surprisingly, found that utilizing this apparatus for the synthesis of methyl formate under the conditions defined above makes it possible for the different problems encountered in previously proposed processes to be solved in a simple and effective manner.

In order to enable the advantages provided by the process of the present invention to be better understood, an apparatus which can be used for this purpose will now be described, with reference to FIG. 1 of the accompanying drawing.

The apparatus comprises a reaction vessel 1, a circulation pump 2, a heat exchanger 3 and a device 4 for sucking and dispersing carbon monoxide into the liquid reaction mixture permanently circulating between the reaction vessel 1 and the heat exchanger 3, through the circulation pump 2, in the direction as shown by the arrows in FIG. 1. The device 4 can comprise a perforated plate through which pass the jets of the liquid reaction mixture which are crashed down on an impact plate in the presence of the gaseous phase in such a manner that intimate contact between the gaseous phase and the liquid phase is achieved. In the accompanying drawing, the device 4 is shown in the form of a venturi; however, it is obvious that the device 4 used can be any device which ensures sucking of the gaseous phase by means of the liquid phase, while producing the most intimate possible mixing together of these two phases.

The carbon monoxide (or gas containing it) is introduced at a constant flow rate through pipe 5 into the top part of the vessel 1, which is reserved for the gaseous phase, while the methanol containing the desired amount (see hereinafter) of alkali metal or alkaline earth metal methoxide in solution is fed at a constant flow rate through pipe 6 below the level 11 of separation of the gaseous phase and liquid phase. The outgoing gases (mainly inert gases and, to a considerably lesser extent, small amounts of carbon monoxide) leave the vessel 1 through pipe 7. The pressure in the apparatus is kept constant by introducing the reactants at a constant flow rate and with the aid of a valve 8 which is set at the desired reaction pressure. A condenser 9 retains any products which may possibly be entrained by the inert outgoing gases. This condenser is useful only if very dilute carbon monoxide is used. The reaction mixture is withdrawn from the apparatus through a valve 10 set at the level of the liquid reaction mixture 11 in the reaction vessel 1; the amount of reaction mixture withdrawn from the system is, therefore, proportional to the amounts of reactants introduced.

An apparatus having same similarities with the apparatus of the present invention has already been used for the production of formamides from carbon monoxide and a nitrogen compound; it is described in British Patent Specification No. 1,213,173. However, an essential difference is that, in the apparatus of the British Patent Specification, the carbon monoxide is the agent entraining a liquid reaction mixture, unlike the apparatus of the present invention in which the liquid reaction mixture is the agent entraining carbon monoxide or gaseous mixture containing carbon monoxide. From the industrial point of view, this difference has considerable repercussions in the sense that, unlike what occurs in the apparatus of the above-mentioned British Patent Specification, it is not necessary to recycle carbon monoxide in the process of the present invention, so that the considerable expenses involved in the recycling gases in order to maintain an economically acceptable conversion of carbon monoxide, to which expenses reference has already been made above, are eliminated.

In the process of the present invention, in order to prevent the dispersed gaseous phase which is not dissolved in the reaction medium from being entrained through the pump, which would cause damage due to cavitation, it is necessary to provide a reaction vessel the height of which is sufficiently great to ensure that undissolved gas bubbles can return, due to difference in density, to the separation level 11 between the gas phase and the liquid phase and, consequently, without being entrained into the circuit of the liquid phase by the pump 2.

The flow rate of the pump must be sufficiently high to ensure a good heat exchange between the reaction vessel 1 and the heat exchanger 3 so that a temperature from about 70 to about 110° C. and preferably from about 75 to about 85° C. is constantly maintained in the reaction vessel and so as to establish during dispersion a contact surface area between the gas phase and the liquid phase of from 750 to 5,000 square meters per cubic meter and preferably of from 1,000 to 2,000 square meters per cubic meter of liquid phase.

In the exchanger 3, the heat exchange between the liquid reaction mixture and the heating and/or cooling liquid is effected indirectly through a heat exchange surface.

The pressure prevailing in the system during the performance of the process of the present invention is from 20 to 110 bars and preferably from 50 to 105 bars.

It is clear that it is possible to work at higher pressures, but, doing so, one of the advantages of the process according to the invention is lost.

The carbon monoxide used in the process of the present invention may be pure carbon monoxide or a gas containing carbon monoxide and gases which are inert under the conditions of the process, for example hydrogen, nitrogen and hydrocarbons. Thus, the carbon monoxide content in the gas containing carbon monoxide can be from 20 to 100% by volume and preferably from 50 to 100% by volume. Particular care should be taken to ensure that the gas containing carbon monoxide contains the smallest possible amount of water, for example less than 5 ppm, since water destroys the catalyst by forming a precipitate of alkali metal or alkaline earth metal formate.

The methanol used in the process of the present invention can be chemically pure and/or can be technical methanol. As in the case of carbon monoxide, the methanol should contain the smallest possible amount of water, for example less than 100 ppm of water.

The molar ratio of carbon monoxide to methanol in the process of the present invention is advantageously from 0.30 to 0.85 and preferably from 0.45 to 0.80.

The catalyst used in the process of the present invention is an alkali metal or alkaline earth metal methoxide and is preferably sodium methoxide. An amount of catalyst of from about 0.2 to about 4.0% by weight can be used and preferably from about 0.4 to about 2.5% by weight, referred to the amount of methanol used.

The yields of methyl formate which are obtained in the process of the present invention are at least 90 mol %, and even 95 mol percent, referred to the carbon monoxide, when pure carbon monoxide is used, and they are practically 100 mol percent, referred to the methanol used. When using diluted carbon monoxide, the yield of methyl formate referred thereto is obviously lower, for example 35 mol percent, but it may be raised to more than 60 mol percent by utilizing two series-connected reactors (see Examples 5 and 6).

One advantageous characteristic of the process of the present invention is its great flexibility of operation, which is due, on the one hand, to the excellent heat exchange achieved in the apparatus used in the process of the present invention, permitting high productivity, and, on the other hand, to the high rate of circulation of the liquid reaction mixture, which not only provides good stability of the reaction temperature and optimum contact between the gas phase and the liquid phase but also the absence of solid deposits (sodium methoxide and/or formate) on the internal surfaces of the apparatus particularly on the heat exchange surfaces, because of the intensive circulation of the reaction mixture, which prevents the contingent precipitate from being deposited. The problem of solid deposits encountered in previously known processes is, therefore, radically overcome. Furthermore, this operational flexibility makes it possible to use, depending on requirements, variable amounts of catalyst, variable carbon monoxide pressures and variable contents of methyl formate in the reaction product obtained, this being achievable in one and the same apparatus.

Another advantageous characteristic is that the reaction mixture occupies a volume representing at least 80% and preferably at least 90% of the total useful volume of the apparatus, thereby making it possible to reduce considerably the cost of construction and installation of the apparatus for a given hourly production of methyl formate.

As will be shown in the following specific examples, another advantageous characteristic is that methyl formate can be produced under considerably lower pressures than those applied in the processes of the prior art and also at moderate reaction temperatures.

Finally, as has already been explained hereinbefore, another advantageous characteristic of the process of the present invention is that, unlike previously known processes, the recycling of carbon monoxide, which entails considerable investment for compressors for recycling and condensers for cooling the gases, is eliminated.

The type of apparatus preferably used for carrying out the present process is known (see Swiss Patent Specification No. 370,057); it has already been used for the selective hydrogenation of vegetable and animal oils and fats for the purpose of hardening them (see German Patent Specification No. 1,906,448). However, apparatus of this kind has hitherto not been used for the synthesis of methyl formate by the process of the present invention.

In order to permit a better understanding of the scope of the present invention and of the following examples, it is appropriate to recall some features of the synthesis of methyl formate:

(1) This relates to an equilibrium reaction in which the limit of conversion of methanol into methyl formate increases, at a given temperature, with the increased partial pressure of carbon monoxide. However, the limit of conversion which can be reached decreases beyond a certain temperature, as is shown in the following Table:

TABLE

| temperature in °C. | pressure in kg/cm$^2$ | limit of conversion of methanol in % by weight |
|---|---|---|
| 80 | 20 | 20 |

TABLE-continued

| temperature in °C. | pressure in kg/cm² | limit of conversion of methanol in % by weight |
|---|---|---|
| 80 | 40 | 40 |
| 80 | 60 | 62 |
| 80 | 80 | 85 |
| 100 | 20 | 10 |
| 100 | 40 | 20 |
| 100 | 60 | 35 |
| 100 | 80 | 52 |

It should be noted that these values are invariable thermodynamic data, independent of the process used.

(2) In order to obtain a satisfactory productivity of methyl formate, it is not advantageous to continue the conversion of methanol beyond 75 to 85% of the limit of conversion indicated above because, above these values, the reaction velocity decreases considerably and tends towards zero (see Examples 1 and 2).

(3) On the other hand, at an experiment level, it has been found that the reaction velocity increases when there is a rise of the reaction temperature and/or partial pressure of carbon monoxide and/or percentage by weight of catalyst in solution, which can be represented by the following equation in which the contact surface area between the gas phase and the liquid phase is involved:

$$r = K \cdot a e^{-E/RT} \cdot c \cdot p$$

in which:
r = reaction velocity
a = contact surface area between gas and liquid
c = catalyst concentration in solution
p = partial pressure of carbon monoxide in the gas phase
E = activation energy
T = absolute temperature
R = molar gas constant
K = proportionality coefficient It can be seen that once the values of c, p and T have been fixed, the value of r is proportional to that of a, i.e. the extent of the contact surface area between the liquid phase and the gas phase. The importance of this factor a had already been foreshadowed in the above-mentioned British Patent Specification No. 1,213,173, in the synthesis of dimethylformamide from carbon monoxide and dimethylamine. However, whereas in this Patent Specification the maximum value given to the factor a is 510 m²/m³ of liquid phase (Table I of Example I, column 5), in the process of the present invention this value is between 750 and 5,000 m²/m³ of liquid phase.

In the following examples, which are given only for the purpose of illustrating the present invention, use is made of an apparatus of the kind illustrated diagrammatically in FIG. 1 of the accompanying drawing, the total useful volume of which apparatus is 60 liters (examples 1 to 5), the pump having been set to a flow rate providing a value of a of about 1200 m²/m³ of liquid phase. The volume occupied by the liquid phase in the apparatus is about 50 to 55 liters, which represents occupation of from 83 to 91% of the total useful volume of the apparatus.

EXAMPLE 1

89 kg. of methanol containing, in solution, 2.5% by weight of sodium methoxide, are introduced per hour through pipe 6, while 24.7 kg. of carbon monoxide of 99.2% purity are introduced per hour through pipe 5. These two reactants are practically free from water and from carbon dioxide. The operating pressure is kept at 44 bars by appropriate adjustment of the blow-off 7, the operating temperature being kept constant at 80° C. with the aid of the heat exchanger 3 through which water flows at a temperature of 60° C. In order to maintain the constant liquid level at 11, 111.5 kg. of reaction mixture containing 43.6% by weight of methyl formate are withdrawn per hour at D, i.e. a production of 48.6 kg. of pure methyl formate.

In this Example, the operation is such that the conversion of methanol is only 30%, thus representing 75% of the possible limit of conversion, which is about 40% at this temperature and at this partial pressure of carbon monoxide (see the above Table).

The yield referred to carbon monoxide is 92 mol percent and the yield referred to methanol is practically quantitative.

Under the conditions of operation mentioned above, the productivity is 48.6/60=0.81 kg. of methyl formate per hour per liter of reaction apparatus.

The catalyst and the unconverted methanol separated from the methyl formate by distillation at the outlet of the apparatus are reused in the system. At no time is the formation of a solid deposit observed.

This Example shows that methyl formate can be produced advantageously with pressures and temperatures lower then those hitherto employed.

EXAMPLE 2

This Example shows that it is not advantageous to reach the thermodynamic limit of conversion because of the fall of the reaction velocity occurring in proportion as this limit value is approached.

The conditions of operation are, therefore, the same as in Example 1 except that, instead of a conversion of methanol of 30% (75% of limit of conversion), the conversion of methanol is here 36% (90% of limit of conversion).

For this purpose, 25.9 kg. of methanol containing 2.5% by weight sodium methoxide and 8.9 kg. of carbon monoxide of 99.2% purity are introduced per hour.

In order to maintain the constant level at 11 in the reactor, 34.1 kg. of reaction mixture containing 51.3% by weight of methyl formate are withdrawn per hour at D, i.e. a production of 17.5 kg. of pure methyl formate per hour. Productivity is now no more than 17.5/60=0.29 kg. of methyl formate per hour per liter of reaction apparatus (instead of 0.81 as in Example 1).

EXAMPLE 3

This Example shows that the formation of a solid precipitate does not hinder production, in contrast to the previously known processes.

The operation is carried out as in Example 1 but introducing per hour 11.97 kg. of carbon monoxide of 99.5% purity and 18.14 kg. of methanol containing 0.5% by weight of sodium methoxide and adjusting the pressure to 100 bars and the temperature to 80° C. The reactants intentionally contain humidity (carbon monoxide: 120 ppm of water; methanol: 0.04% by weight of water) so as to produce a precipitate of sodium formate. Under the conditions of operation mentioned, the formation of sodium formate crystals is observed after about half an hour. Because of the turbulence caused by the high flow rate of the pump 2, these crystals remain constantly in suspension in the liquid reaction medium and are not deposited anywhere in the apparatus and, in particular, not on the surfaces of the heat exchanger 3, which is easily seen from the fact that the reaction temperature is kept constant at 80° C.

29.5 kg. per hour of reaction mixture containing 82.5% by weight of methyl formate are withdrawn at D, i.e. a production of 24.3 kg. of pure methyl formate per hour and a productivity of 24.3/60=0.4 kg. of methyl formate per hour per liter of the reaction apparatus.

The methyl formate is separated from the reaction mixture by distillation as in Example 1 and the methanol and sodium methoxide are recycled to the reaction after the precipitate of sodium formate has been separated by filtration.

EXAMPLE 4

This Example shows the great flexibility of the process of the present invention with regard to the conditions of operation and, in addition, it proves that hitherto unknown productivities can be achieved.

The procedure of Example 1 is followed, with the exception that the feed of carbon monoxide (of 99.2% purity) is increased to 152 kg. per hour and that of the methanol solution (containing 2.5% by weight of sodium methoxide) is increased to 340 kg. per hour.

The pressure is maintained at 100 bars and the temperature at 100° C.; a yield of 95 mol percent referred to carbon monoxide and a yield of 100 mol percent referred to methanol are observed.

484 kg. of a mixture containing 64% of methyl formate are withdrawn per hour at D, i.e. 310 kg. per hour of pure methyl formate. The productivity is, therefore, 310/60=5.16 kg of methyl formate per hour per liter of the reaction apparatus.

EXAMPLE 5

This Example shows that, instead of pure carbon monoxide, it is also possible to use gaseous mixtures containing carbon monoxide.

The procedure of Example 1 is followed but the carbon monoxide of 99.2% purity is replaced by a mixture containing about 50% of carbon monoxide and about 50% of hydrogen, the total pressure being kept at 105 bars (i.e. a partial pressure of carbon monoxide of about 40 bars, taking into account the blow-off effected at 7).

The same conversion of methanol into methyl formate as in Example 1 is observed but the yield referred to the carbon monoxide is only 38.4 mol percent. This yield can be improved as indicated in Example 6.

EXAMPLE 6

Two apparatus of the type illustrated diagrammatically in the accompanying drawing are connected in series and the gases and liquids are circulated therein counter-currently.

The first apparatus has a total volume of 30 liters; it is kept under a pressure of 100 bars at a temperature of 80° C. and is fed at a flow rate of 71 kg./hour with the same gaseous mixture containing 50% of carbon monoxide and 50% of hydrogen as was used in Example 5.

The gas leaving the first apparatus is restored to a pressure of 100 bars and then passed into the second apparatus, the total volume of which is 50 liters and in which the total pressure is kept at 95 bars and the temperature at 80° C. This second apparatus is fed with a methanol solution containing 2.5% by weight of sodium methoxide at a flow rate of 97.64 kg. per hour.

The liquid reaction mixture leaving the second apparatus is used to feed the first apparatus. From the first apparatus, a liquid mixture passes out at a flow rate of 122.68 kg. per hour, this mixture containing 43.7% by weight of methyl formate, i.e. a production of 53.6 kg. per hour of pure methyl formate. The productivity is, therefore, 53.6/(30+50)=0.67 kg. of methyl formate per hour per liter of the two reaction apparatus.

The yield, referred to carbon monoxide, of the operation for the two apparatus is, therefore, 70.3 mol percent, i.e. practically twice the corresponding yield obtained in Example 5.

Once the two apparatus have reached stationary operating conditions, which on average takes 0.75 hour for the first reactor and 1 hour for the second, the temperature of 80° C. in these two reactors is very easily kept constant, even if a solid precipitate is formed. Because of the turbulence of the liquid phase passing through the two reactors, the precipitate is kept constantly in homogeneous suspension without a deposit being formed.

We claim:

1. In a process for the production of methyl formate, wherein a current of a gas containing carbon monoxide is reacted at elevated temperature and pressure in a reaction zone with a recycled current of liquid reaction mixture containing
   (a) methanol
   (b) an alkali metal or alkaline earth metal methoxide as catalyst, and
   (c) methyl formate produced as reaction product, part of the current of liquid reaction mixture being withdrawn in order to recover the methyl formate therefrom, the improvement which comprises providing in the reaction zone a venturi means which ensures sucking of the current of gas by the recycled current of liquid reaction mixture, and maintaining the temperature in the reaction zone at from about 70 to about 110° C. and the contact surface area between the gas phase and the liquid phase at from 750 to 5,000 sq. meters per cubic meter of liquid phase.

2. A process according to claim 1, wherein the temperature in the reaction zone is from about 75 to about 85° C.

3. A process according to claim 1, wherein the pressure in the reaction zone is from 20 to 110 bars.

4. A process according to claim 1, wherein the pressure in the reaction zone is from 50 to 105 bars.

5. A process according to claim 1, wherein the contact surface area between the gas phase and the liquid phase is of from 1,000 to 2,000 sq. meters per cubic meter of liquid phase.

6. A process according to claim 1, wherein the molar ratio of carbon monoxide to methanol is from 0.30 to 0.85.

7. A process according to claim 1, wherein the molar ratio of carbon monoxide to methanol is from 0.45 to 0.80.

8. A process according to claim 1, wherein the catalyst is used in an amount of from about 0.2 to about 4.0% by weight, referred to the amount of methanol used.

9. A process according to claim 1, wherein the catalyst is used in an amount of from about 0.4 to about 2.5% by weight, referred to the amount of methanol used.

10. A process according to claim 1, wherein the gas containing carbon monoxide used is substantially pure carbon monoxide.

11. A process according to claim 1, wherein the gas containing carbon monoxide is a mixture containing about 50% of carbon monoxide and about 50% of hydrogen.

* * * * *